United States Patent
Kreissl et al.

[11] 3,798,504
[45] Mar. 19, 1974

[54] DEVICE FOR SHUTTING OFF DRIVE MOTORS OF ROTATING MACHINE PARTS IN CASE OF OVERLOAD AND/OR DESTRUCTION OF A MACHINE PART

[75] Inventors: Ottmar Kreissl, Dachau; Eckhard Pritsch, Haaren, both of Germany

[73] Assignees: Maschinenfabrik Augsburg-Nurnberg, Munich; URANIT Vran-Isotapentrennungs-GmbH, Julich Stetteniche, both of, Germany

[22] Filed: Mar. 27, 1972

[21] Appl. No.: 238,339

[30] Foreign Application Priority Data
Mar. 25, 1971 Germany............................ 2114406

[52] U.S. Cl.................. 317/13 R, 310/71, 310/273
[51] Int. Cl. ................................................ H02h 7/08
[58] Field of Search .............. 310/71, 260, 273, 214, 310/68, 72, 74; 317/13 R

[56] References Cited
UNITED STATES PATENTS

| | | | |
|---|---|---|---|
| 2,623,962 | 12/1952 | Holstein | 310/68 E |
| 1,492,022 | 4/1924 | Eddy | 310/214 |
| 2,436,042 | 2/1948 | Hansen | 310/71 |
| 3,175,124 | 3/1965 | Russell | 317/13 R |
| 3,293,463 | 12/1966 | Church | 310/71 |
| 3,308,316 | 3/1967 | Pfahl | 310/71 |

FOREIGN PATENTS OR APPLICATIONS
922,130   7/1949   Germany

*Primary Examiner*—William M. Shoop, Jr.
*Assistant Examiner*—Harvey Fendelman
*Attorney, Agent, or Firm*—Craig and Antonelli

[57] ABSTRACT

An installation for shutting off the drive motors of rotating machine parts in case of overload or short-circuit by extending the power supply wires between the stator winding of the motor and a connector plug, loop-shaped in a boss protruding into the space accommodating the rotating machine part so that the power supply wires are broken when the boss is sheared off upon mechanical failure of the machine part; in case of short-circuit, fuses connected into the power supply circuit ahead of the connector plug will also open the power supply circuit.

6 Claims, 1 Drawing Figure

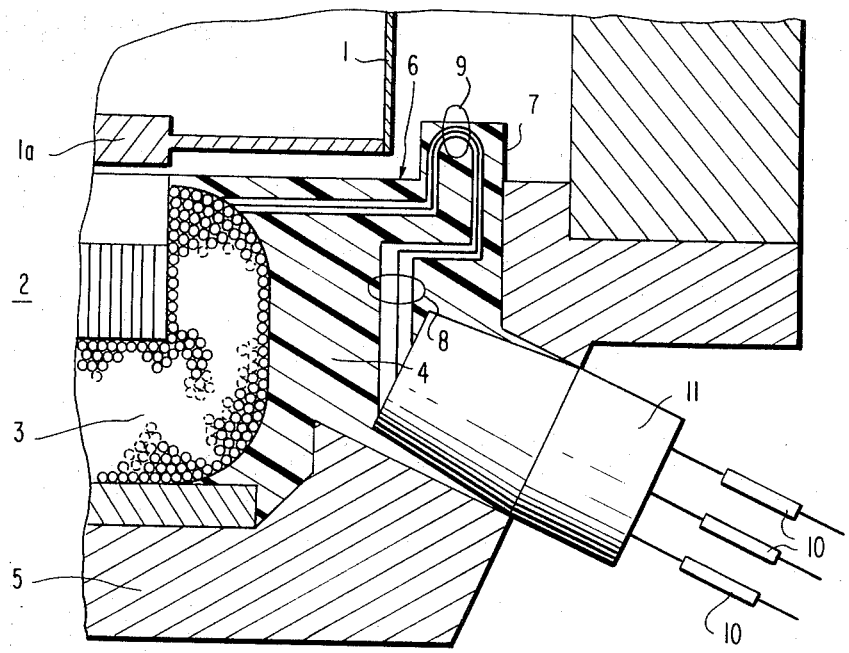

DEVICE FOR SHUTTING OFF DRIVE MOTORS OF ROTATING MACHINE PARTS IN CASE OF OVERLOAD AND/OR DESTRUCTION OF A MACHINE PART

This invention relates to a device for shutting off drive motors of rotating machine parts in case of overload and/or destruction of one of the machine parts, whereby an electrical contact is actuated which shuts off the affected machine part by shutting off the drive motor thereof.

A load-absorbing machine part has been described in German Pat. No. 922,130 which is to be destroyed under overload conditions in order to avoid major damage, its destruction triggers a switching action by means of which e.g. the drive motor is shut down. In this case, a shear pin is constructed to interrupt an electrical circuit. Upon destruction of a machine part, a loop embedded in the shear pin is simultaneously sheared off and a circuit supplied by a transformer is interrupted. Consequently, a solenoid arranged in the circuit is de-energized and that the power supply to the motor is interrupted by means of the armature of a contactor. Due to the required contactor, the expenditures in the circuitry necessary with the device as known heretofore, are very large and the circuitry becomes very sophisticated. Furthermore, no motor shutoff can be expected in case of a short-circuit.

The object of the present invention resides in providing a reliable means of interrupting the motor current supply without using a sophisticated circuitry if a machine part should fail.

The present invention essentially consists in that the power supply wires between the connector plug and the stator winding of the motor extend, e.g., as a part of the armature sealing compound, loop-shaped in a boss or lug protruding into the chamber of the rotating machine parts, whereby the power supply is interrupted after shear-off of the boss or in case of a short-circuit by means of the fuses inserted into the circuit ahead of the plug. Another feature of the present invention resides in that the boss is arranged in such a way that, although it will not be damaged during operation, it will be sheared off immediately following overloading or destruction of a machine part.

The advantage of the present invention is seen in that with the shear-off of the so-called boss an interruption of the power supply wires ensures a shut-off of the motor in the same way as would a short circuit between the wires. In the latter case, fuses inserted into the power supply circuit ahead of the plug take care of the interruption of the power supply. By reason of the fact that both cases will lead to the desired effect of shutting off the motor, the reliability of a device according to the present invention is considerably increased. Furthermore, the possibility of a shear-off of the power supply wires proper saves the use of a contactor which in the device known heretofore serves the purpose of interrupting the current supply. In contradistinction thereto, in the present invention only the cost for producing the boss, in which the power supply wires are embedded, have to be considered.

Accordingly, it is an object of the present invention to provide a safety installation for rotating machine parts which avoids by simple means the aforementioned shortcomings and drawbacks encountered in the prior art.

Another object of the present invention resides in a rotating machine driven by an electric motor which is reliably shut-off in case of overload or short-circuit.

A further object of the present invention resides in a protective installation which is simple in construction and relatively inexpensive yet effectively protects the rotating assembly against overloads involving structural failures as well as short-circuits.

These and other objects, features and advantages of the present invention will become more apparent from the following description when taken in connection with the accompanying drawing which shows, for purposes of illustration only, one embodiment in accordance with the present invention, and wherein The single FIGURE is a partial schematic cross-sectional view of a motor-driven rotating machine provided with a safety installation in accordance with the present invention.

Referring now to the single FIGURE of the drawing, reference numeral 1 designates therein . . . a rotating machine part, driven by a motor, generally designated by reference numeral 2, by way of a disc 1a. The motor 2 is supported with its stator winding 3, which is surrounded by a winding sealing 4 of any conventional type, in an external motor housing 5. The surface 6 of the winding sealing 4 facing the disc 1a, is provided with a pin-like boss 7 positioned approximately 6 to 8 mm laterally of the rotating machine part 1 and containing the power supply wires 8 in the form of a loop 9. Through the power supply wires 8, the electrical current is conducted by way of the fuses 10, the connector plug 11, secured in the motor housing 5, and by way of the loop 9 to the motor stator winding 3. It can be seen from this embodiment that the boss 7 will not be damaged during normal operation, but will be sheared off only by debris thrown about in case of a collapse or destruction of the rotating machine part, leading to an immediate interruption of the power supply.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A device for automatically stopping a drive motor of a rotating member in the event of a least one of an overload and rotational destruction of the rotating member comprising a rotating member, an electric drive motor for rotating said member about an axis of rotation, power supply wires connecting a stator winding of said motor to a connector plug, a pin-like boss means disposed adjacent to a rotating portion of said member and a loop-like arrangement of said power supply wires disposed in said boss means wherein in the event of rotational destruction of the rotating member the boss means is sheared off whereby said power-supply wires are broken.

2. An installation according to claim 1 characterized in that the boss means forms part of a winding sealing for the stator winding.

3. A device according to claim 1, further comprising fuse means operatively connected to the power supply wires whereby in the event of an overload said motor is stopped.

4. A device according to claim 1, wherein said boss means is disposed laterally adjacent said rotating portion of said member.

5. A device according to claim 3, wherein said fuse means are disposed in said power supply wires between said connector plug and a power source.

6. A device according to claim 1, wherein said boss means is disposed in a chamber formed between said rotating portion of said member and an outer housing.

* * * * *